US012777121B2

(12) United States Patent
Tachibana

(10) Patent No.: US 12,777,121 B2
(45) Date of Patent: Oct. 27, 2026

(54) INSPECTION METHOD AND APPARATUS FOR READING IMAGE TO GENERATE INSPECTION IMAGE AND DETECTING DEFECT IN THE IMAGE, AND NON-TRANSITORY RECORDING MEDIUM

(71) Applicant: Hiroki Tachibana, Kanagawa (JP)

(72) Inventor: Hiroki Tachibana, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 261 days.

(21) Appl. No.: 18/629,940

(22) Filed: Apr. 9, 2024

(65) Prior Publication Data

US 2024/0340379 A1 Oct. 10, 2024

(30) Foreign Application Priority Data

Apr. 10, 2023 (JP) ................................ 2023-063518

(51) Int. Cl.

| | |
|---|---|
| ***H04N 1/00*** | (2006.01) |
| ***G06T 7/00*** | (2017.01) |
| *H04N 1/193* | (2006.01) |

(52) U.S. Cl.

CPC ....... *H04N 1/00013* (2013.01); *G06T 7/0004* (2013.01); *H04N 1/00029* (2013.01); *H04N 1/00047* (2013.01); *H04N 1/00074* (2013.01); *H04N 1/00087* (2013.01); *G06T 2207/10008* (2013.01); *G06T 2207/30144* (2013.01); *H04N 1/193* (2013.01)

(58) Field of Classification Search

USPC ........................ 358/474, 497, 504–505, 1.14

See application file for complete search history.

(56) References Cited

U.S. PATENT DOCUMENTS

| | | | | |
|---|---|---|---|---|
| 10,981,376 | B2 * | 4/2021 | Kamada .................. | G06T 7/001 |
| 2015/0221077 | A1 * | 8/2015 | Kawabata .............. | G06T 7/337 382/141 |
| 2019/0230229 | A1 * | 7/2019 | Terauchi .............. | G03G 15/221 |
| 2019/0238686 | A1 * | 8/2019 | Sakatani ............ | H04N 1/00005 |
| 2019/0387126 | A1 * | 12/2019 | Shiraki .................. | G06T 7/001 |
| 2023/0336668 | A1 * | 10/2023 | Kobayashi ......... | H04N 1/00045 |

FOREIGN PATENT DOCUMENTS

| | | |
|---|---|---|
| JP | 2019-129406 A | 8/2019 |
| JP | 2020-096309 A | 6/2020 |
| JP | 2022-072778 A | 5/2022 |

* cited by examiner

*Primary Examiner* — Haris Sabah

(74) *Attorney, Agent, or Firm* — XSENSUS LLP

(57) ABSTRACT

An inspection apparatus, an inspection method, and a program stored on a recording medium, each of which generates a second inspection target image, based on a result of a reader reading a reference face; detects a defect in the second inspection target image; generates a first inspection target image, based on an image read at the reader from a printed matter printed at a printing apparatus; determines a defect in the printed matter, based on the first inspection target image and a master image generated from print data of the printed matter; and in a case where the defect is detected in the second inspection target image, excludes a position of the detected defect from an area where a defect in the printed matter is inspected.

9 Claims, 7 Drawing Sheets

FIG. 5

JOB MANAGEMENT INFORMATION

| PARAMETER | REMARK | INITIAL VALUE |
|---|---|---|
| JOB GENERATION SOURCE | DFE JOB, INTERNAL JOB | SET BY GENERATION SOURCE |
| GENERATION TIME | TIME WHEN GENERATION SOURCE GENERATED JOB INFORMATION | SET BY GENERATION SOURCE |
| PAGE ID | IDENTIFICATION INFORMATION OF PRINT PAGE, INCREMENTED BY 1 EACH TIME ONE PAGE IS OUTPUT SINCE POWER-ON | 0 |
| PRINT FACE | SINGLE-SIDED, DOUBLE-SIDED FRONT, DOUBLE-SIDED BACK | SET BY GENERATION SOURCE |
| SHEET ID | IDENTIFICATION INFORMATION OF PRINT SHEET, INCREMENTED BY 1 EACH TIME ONE SHEET IS OUTPUT SINCE POWER-ON | 0 |
| COPY ID | IDENTIFICATION INFORMATION IN UNITS OF COPIES, INCREMENTED BY 1 EACH TIME OUTPUT OF ONE COPY IS COMPLETED SINCE POWER-ON | 0 |
| JOB ID | IDENTIFICATION INFORMATION IN UNITS OF JOBS, INCREMENTED BY 1 EACH TIME OUTPUT OF ONE JOB IS COMPLETED SINCE POWER-ON | 0 |
| SHEET TYPE | TYPE OF SHEET | SET BY GENERATION SOURCE |
| SHEET SIZE | SIZE OF SHEET | SET BY GENERATION SOURCE |
| JOB TYPE | SUBJECTED TO DEFECT DETECTION, NOT SUBJECTED TO DEFECT DETECTION, INTERLEAF FOR IDENTIFICATION OF DEFECT DETECTION | SET BY GENERATION SOURCE |
| ... | ... | ... |

INSPECTION METHOD AND APPARATUS FOR READING IMAGE TO GENERATE INSPECTION IMAGE AND DETECTING DEFECT IN THE IMAGE, AND NON-TRANSITORY RECORDING MEDIUM

CROSS-REFERENCE TO RELATED APPLICATIONS

This patent application is based on and claims priority pursuant to 35 U.S.C. § 119 (a) to Japanese Patent Application No. 2023-063518, filed on Apr. 10, 2023, in the Japan Patent Office, the entire disclosure of which is hereby incorporated by reference herein.

BACKGROUND

Technical Field

The present disclosure relates to an inspection apparatus, an inspection method, and a non-transitory recording medium.

Related Art

A printing system of the related art includes a printing apparatus and an inspection apparatus. The printing apparatus forms an image on a sheet based on print data. The inspection apparatus reads the image with a reader, and compares the read image with a master image generated from the original print data. The inspection apparatus evaluates a printing quality in accordance with a result of the comparison. To correctly evaluate the printing quality, the reader is desirably free from any defect such as dirt.

A technique of detecting a defect without passing a sheet, and excluding the defect is disclosed as a technique of detecting a defect caused by a reader.

The above-described technique, however, involves cleaning of the reader by a user to solve the defect caused by the reader. In case of the defect caused by the reader, the printing quality is normal. Thus, the user may desire to proceed with printing without cleaning the reader. However, since the user is not informed whether the detected defect is caused by the printing process or by dirt on the reader, the user may inevitably clean the reader.

SUMMARY

Example embodiments include an inspection apparatus, an inspection method, and a program stored on a recording medium, each of which generates a second inspection target image, based on a result of a reader reading a reference face; detects a defect in the second inspection target image; generates a first inspection target image, based on an image read at the reader from a printed matter printed at a printing apparatus; determines a defect in the printed matter, based on the first inspection target image and a master image generated from print data of the printed matter; and in a case where the defect is detected in the second inspection target image, excludes a position of the detected defect from an area where a defect in the printed matter is inspected.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of job management information;

Figure 1:
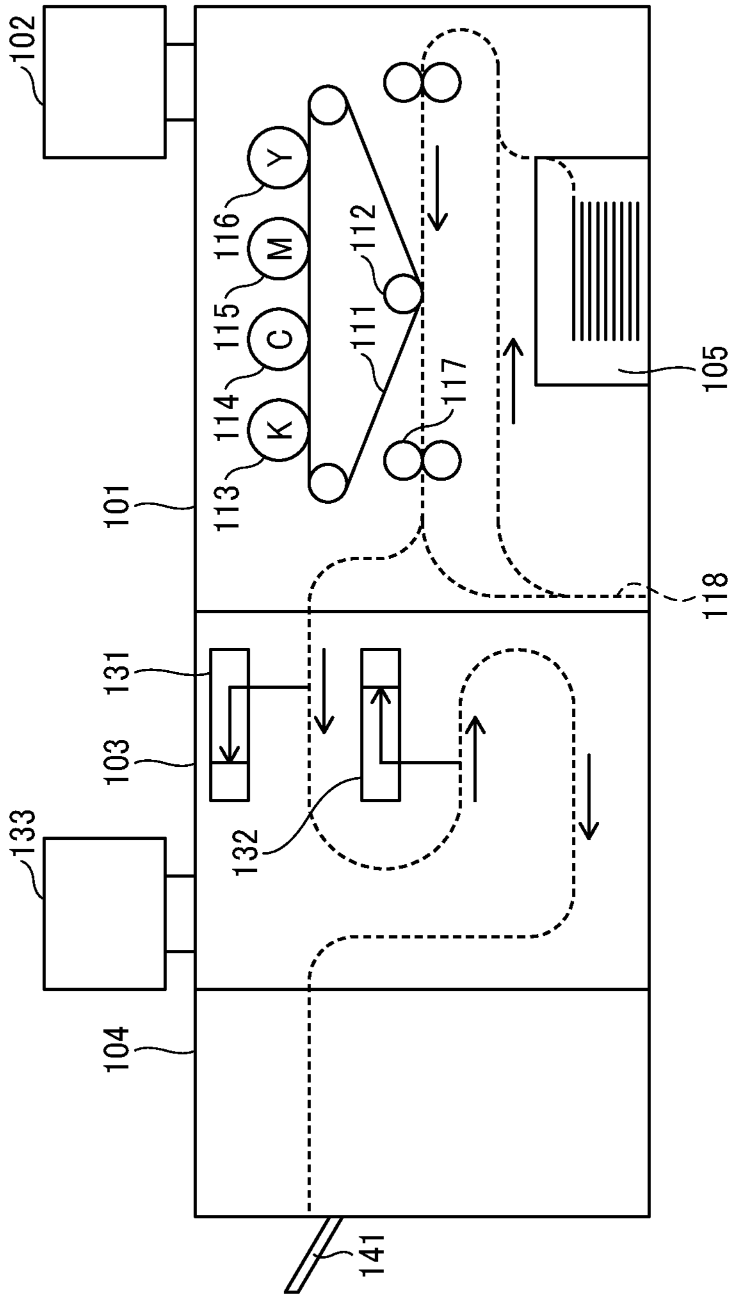
FIG. 1 is a schematic diagram illustrating an example system configuration of a printing system according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An inspection apparatus and an inspection method performed by the inspection apparatus will be described below as an example with reference to the accompanying drawings.

Overview of Process

A printing system according to the present embodiment reads an actual printed matter with a reader that is implemented, for example, by a sensor, and generates an inspection target image (an example of a first inspection target image). The printing system according to the present embodiment compares the first inspection target image with a master image generated from original print data of the printed matter, and determines whether the printed matter is output with an expected quality. If the first inspection target image and the master image have a difference of a certain extent or greater, the printing system determines that a defect is present. Such a case includes a case where a printing process has some kind of trouble and a case where the reader has a defect such as dirt.

However, since a user is not informed whether the detected defect is caused by the printing process or the dirt (an example of the defect) on the reader, the user may inevitably clean the reader. This reduces the productivity of the printed matter. In the case where a defect is detected, to present an appropriate maintenance method to the user, whether the cause of the defect is in reading or printing is desirably identified.

Accordingly, the printing system according to the present embodiment detects a defect of a reader without reading an actual original (hereinafter, referred to "without passing a sheet" or "no-sheet-passing"), and sets an area of the detected defect as an inspection exclusion area. Specifically, the printing system performs the following.

The printing system generates an inspection target image (an example of a second inspection target image) without passing a sheet. The second inspection target image generated without passing a sheet is an image generated as a result of the reader reading a predetermined reference face (for example, a reference board) and is a substantially uniform image of white pixels or black pixels as a whole if there is no defect such as dirt.

The printing system detects a defect in the second inspection target image generated without passing a sheet.

The printing system sets the defect detected in the second inspection target image generated without passing a sheet, as an inspection exclusion area. Alternatively, the printing system may allow the user to set the inspection exclusion area with reference to the detected defect. In the inspection exclusion area, even though a difference between the first inspection target image and the master image has a defect during actual printing, it is highly likely that this defect is caused by dirt on the reader. Thus, the inspection apparatus does not output a remainder or an alert recommending cleaning.

Therefore, the printing system according to the present embodiment detects a defect caused by the reader before printing is started, so that a defect caused by the reader is not to be detected during printing. That is, the printing system according to the present embodiment does not output a remainder or an alert recommending the user to clean.

Terminology

The term "inspection target image" refers to an image that is used in inspection of the printing quality and is generated as a result of the reader performing optical reading. Examples of the inspection target image include an image generated as a result of a printed matter being read (first inspection target image), and an image generated as a result of a reference face being read without passing a sheet (second inspection target image).

The term "master image" refers to an image that is generated from original print data of the printed matter and serves as a reference of the printing quality.

The term "defect" refers to a portion not meeting the reference of the printing quality or a state not meeting the reference. Examples of the defect include a defect caused in the first inspection target image of a printed matter and a defect caused in the second inspection target image generated as a result of the reference face being read without passing a sheet. In the former case, the printing quality decreases. The cause of such decrease may be an issue in the printing process or dirt on the reader. In the latter case, dirt may be on the reader.

Example of System Configuration

FIG. 1 is a schematic diagram illustrating an example system configuration of a printing system 100 according to the present embodiment. The system configuration of FIG. 1 is merely an example, and any configuration may be used to detect a defect described in the present embodiment.

The printing system 100 includes a printer 101, an inspection apparatus 103, and a stacker 104. All or two of the printer 101, the inspection apparatus 103, and the stacker 104 may be integrated together into one unit. The printer 101 receives data of text, an image, a figure, etc., and performs printing on such as a sheet based on the data. The printer 101 may also be referred to as a printing apparatus or a multifunction peripheral/printer/product (MFP).

The printer 101 is provided with an operation device 102 at a top surface thereof. The operation device 102 includes a display (touch panel) and a keyboard, and displays an operation screen on the display. Specifically, the operation device 102 displays the operation screen of the printing system 100, and receives various operations from a user.

The printer 101 receives a print job including a raster image processor (RIP) image from an external apparatus such as a DFE (described later) or a personal computer (PC), or receives an instruction to execute a print job stored in the printer 101. In the present embodiment, the RIP image has a resolution of 600 dpi for each of cyan (C), magenta (M), yellow (Y), and black (K) each represented by 8 bits as an example.

In accordance with content of the print job which the printer 101 is instructed to execute, the printer 101 acquires a sheet from a sheet feeder 105 and conveys the sheet along a path indicated by a dash line in FIG. 1. The printer 101 forms an image on the sheet with drums 113, 114, 115, and 116. Specifically, toner images of black (K), cyan (C), magenta (M), and yellow (Y) respectively formed on surfaces of the drums 113, 114, 115, and 116 are transferred onto a belt 111 one above the other to form a color toner image. The color toner image is transferred onto the sheet, conveyed from the sheet feeder 105, at a nip formed between the belt 111 and the roller 112. A roller pair 117 fixes the toner image on the sheet with heat and pressure. In the case of single-sided printing, the sheet is ejected to the inspection apparatus 103. In the case of double-sided printing, the sheet is further conveyed to a reverse path 118 and is conveyed to the roller 112. A color toner image, which is made up of images transferred from the drums 113, 114, 115, and 116, is transferred and fixed on the other side of the sheet. The sheet having both sides printed is then ejected to the inspection apparatus 103.

The inspection apparatus 103 inspects the printing quality of the printed matter output by the printer 101. The inspection apparatus 103 is provided with an operation device 133. The operation device 133 may have the same functions as the operation device 102. The operation device 133 may be omitted from the inspection apparatus 103, and the operation device 102 of the printer 101 may serve as the operation device 133 of the inspection apparatus 103. The operation device 133 of the inspection apparatus 103 may be a PC connected via a local area network (LAN). In this case, the PC displays an inspection result via a web browser or a dedicated application, for example.

The inspection apparatus 103 includes reading devices 131 and 132 implemented by sensors, for example. Each of the reading devices 131 and 132 is an example of the reader. The reading devices 131 and 132 read images on the respective sides of the sheet ejected from the printer 101. The sheet is then conveyed along the path in a direction of arrows, and is ejected to the stacker 104. In the present embodiment, the read image has a resolution of 200 dpi for each of red (R), green (G), and blue (B) each represented by 8 bits as an example.

The stacker 104 stacks the sheet ejected from the inspection apparatus 103 on a tray 141.

DFE

A DFE 150 will be described with reference to FIG. 2. The DFE 150 is an example of an apparatus that processes data to be input to a printer. The DFE 150 creates RIP data (raster data) to be printed by the printer 101, from print data such as PostScript data, for example.

Figure 2:
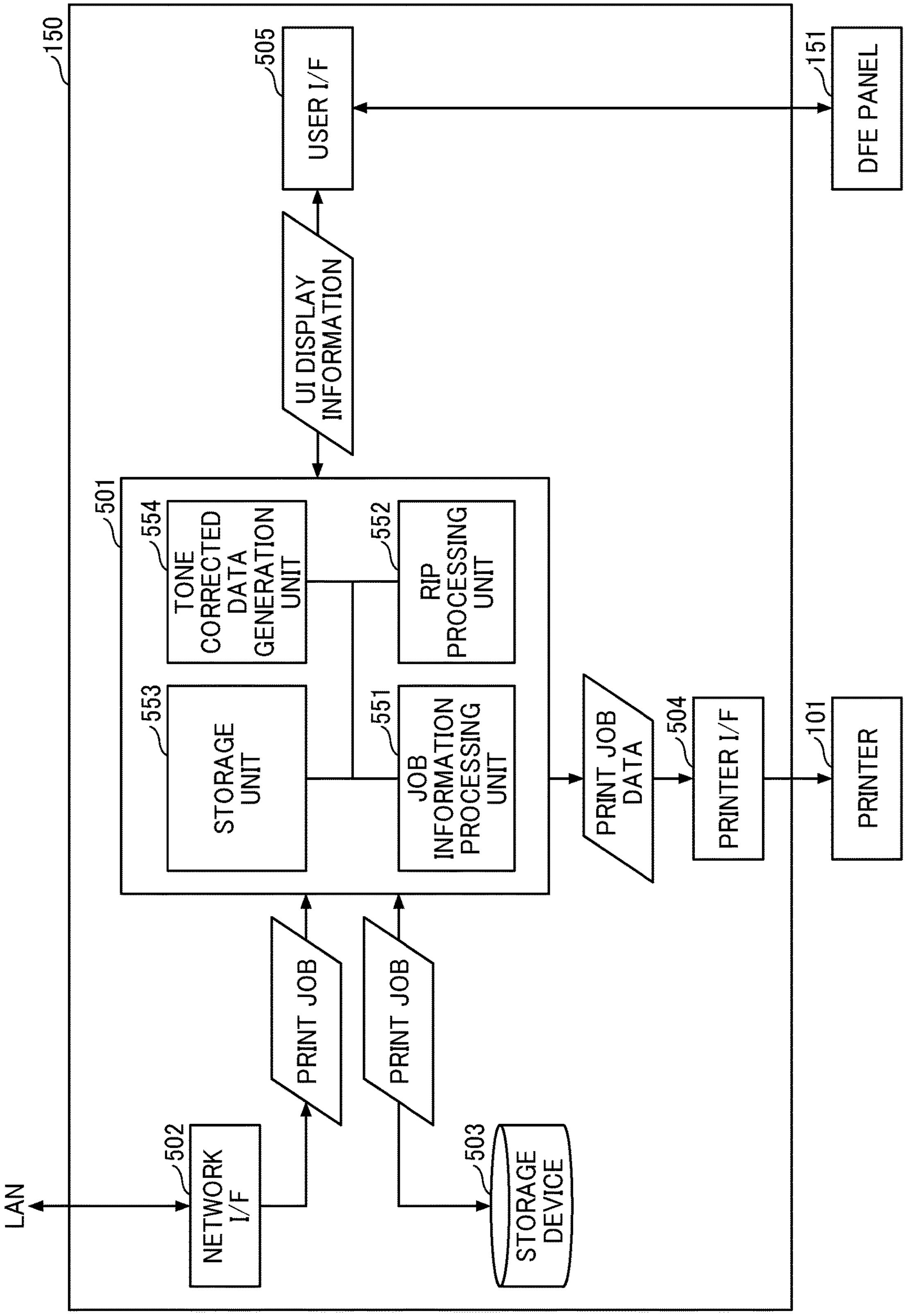
FIG. 2 is a block diagram illustrating an example configuration of a digital front-end (DFE)

FIG. 2 is a block diagram illustrating an example configuration of the DFE 150. The DFE 150 is connected to the printer 101 illustrated in FIG. 1 and a DFE panel 151 operating as a user interface. The DFE panel 151 is a user interface including a display (touch panel) and a keyboard.

The DFE 150 includes a system control section 501, a network interface (I/F) 502, a user I/F 505, a storage device 503, and a printer I/F 504.

The user I/F 505 of the DFE 150, which may be implemented by an interface circuit, generates a screen to be displayed on the DFE panel 151 based on user interface (UI) display information, and causes the DFE panel 151 to display the screen. The UI display information includes information on a plurality of display components included in the screen and arrangement of the display components.

The network I/F 502 of the DFE 150, which may be implemented by an interface circuit, is a communication interface that connects the DFE 150 to the LAN. The network I/F 502 receives a print job from a PC operated by the user via the LAN, and sends the print job to the system control section 501.

The storage device 503 may store the print job, and is implemented by any desired memory. The system control section 501 may acquire the print job from the storage device 503. That is, the system control section 501 may receive the print job via the network I/F 502 or from the storage device 503.

The system control section 501 controls the entire DFE 150. The system control section 501 includes a job information processing unit 551, a RIP processing unit 552, a storage unit 553, and a tone corrected data generation unit 554. These units are functions implemented by a central processing unit (CPU) executing instructions included in one or more programs installed in a memory of the DFE 150.

The job information processing unit 551 manages, as job management information related to a print job, the status of the print job, entry of the print job to the printer 101, the progress of the print job (acquired from the printer 101), etc., in the storage unit 553. The job information processing unit 551 combines the job management information and RIP image data together to generate print job data, and enters the print job data to the printer 101. The storage unit 553 stores print job data (for example, a job ID, a file name, a job registration date and time, and a job owner) related to a print job.

The tone corrected data generation unit 554 adjusts print data so that an image is printed with the tone, density, and color that matches those of the original. For example, the tone corrected data generation unit 554 increases or decreases the tone, increases or decreases the density, or enhances or weakens the warm color or the cool color.

The RIP processing unit 552 processes print data such as PostScript data, and creates RIP data to be printed by the printer 101. The RIP data is dot data (indicating whether to print a dot) for toner of each color.

The printer I/F 504 of the DFE 150, which may be implemented by an interface circuit, is an interface for communicating with the printer 101. The printer I/F 504 transmits, to the printer 101, the print job data which the system control section 501 determines to input.

Printer

Figure 3:
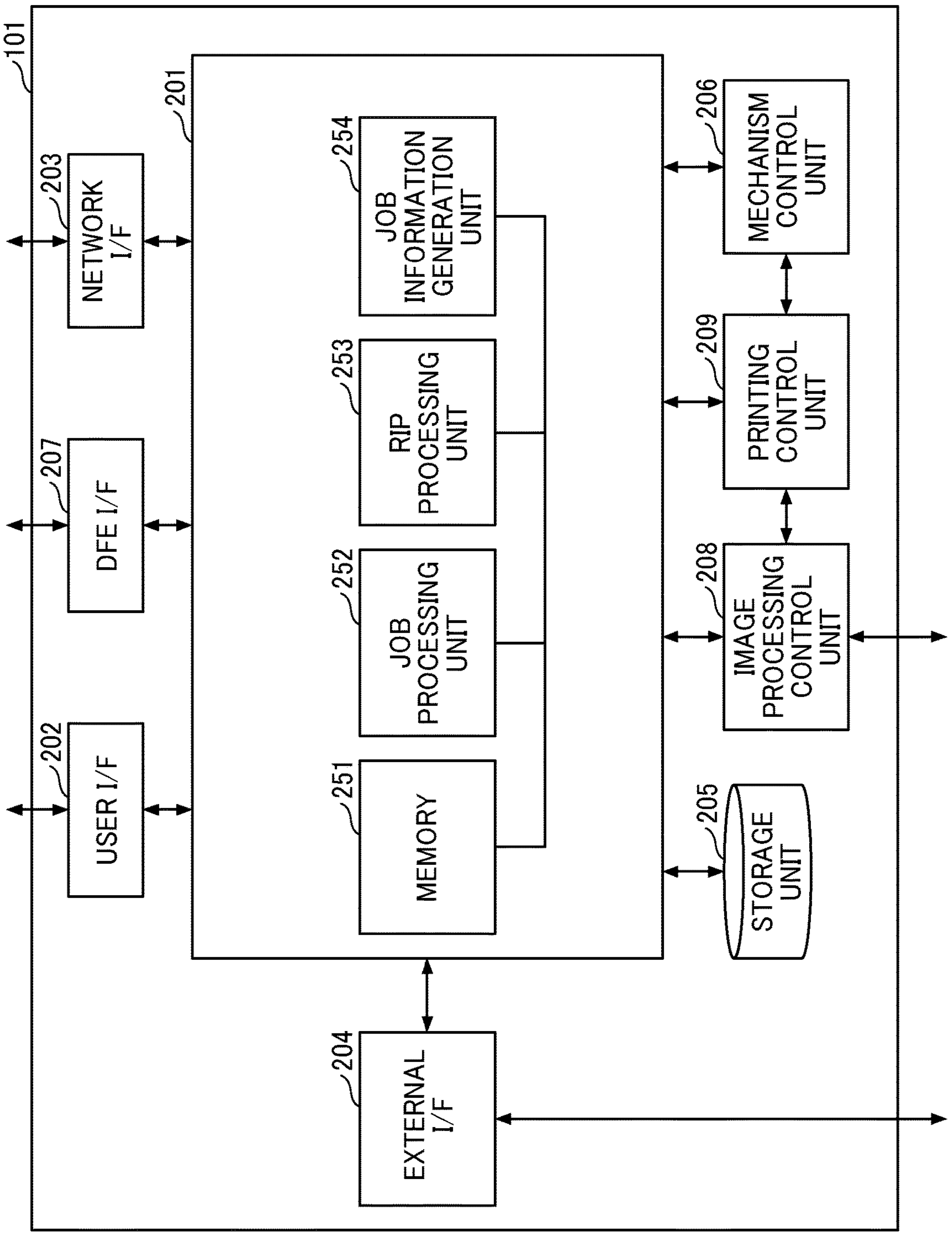
FIG. 3 is a block diagram illustrating an example configuration of a printer.

FIG. 3 is a block diagram illustrating an example configuration of a system control section and its peripheral of the printer 101. The printer 101 includes a system control section 201, a user I/F 202, a DFE I/F 207, a network I/F 203, an external I/F 204, a storage unit 205, an image processing control unit 208, a printing control unit 209, and a mechanism control unit 206. The functional units of the printer 101, which includes the system control section 201, the image processing control unit 208, the printing control unit 209, and the mechanism control unit 206, are implemented by a CPU executing instructions included in one or more programs installed in the printer 101.

The system control section 201 controls the entire printer 101. The system control section 201 is connected to the user I/F 202, the DFE I/F 207, the network I/F 203, the external I/F 204, the storage unit 205, the image processing control unit 208, the printing control unit 209, and the mechanism control unit 206.

The user I/F 202, which may be implemented by an interface circuit, is an interface that connects the system control section 201 to the operation device 102 illustrated in FIG. 1.

The DFE I/F 207, which may be implemented by an interface circuit, is an interface that allows the system control section 201 to communicate with the DFE 150 illustrated in FIG. 2 (to receive print job data, for example).

The network I/F 203, which may be implemented by an interface circuit, is an interface that connects the system control section 201 to a network such as a LAN, and allows the printer 101 to communicate with a device on the network.

The external I/F 204, which may be implemented by an interface circuit, is an interface that allows the printer 101 to communicate with other devices (such as the inspection apparatus 103 and the stacker 104).

The storage unit 205 is implemented by any desired memory such as a hard disk drive (HDD) or a solid state drive (SSD). The storage unit 205 stores print job data, for example.

The mechanism control unit 206 controls mechanisms of the printer 101, for example, controls sheet conveyance, a transfer process, and double-sided/single-sided printing in the printer 101.

The printing control unit 209 instructs the mechanism control unit 206 to perform timing control on the respective mechanisms, and also performs overall control for forming an image on a sheet. The image processing control unit 208 processes an image to be transferred by the mechanism control unit 206.

The system control section 201 includes a memory 251, a job processing unit 252, a RIP processing unit 253, and a job information generation unit 254. The memory 251 is a work memory of the system control section 201. The job information generation unit 254 generates information such as a job ID, a reception date and time, and a progress in the printer 101 in response to receipt of print job data from the DFE 150, and stores the generated information in the storage unit 205. If RIP processing is not performed on a print job, the RIP processing unit 253 performs the RIP processing on the print data. The job processing unit 252 inquires of the printing control unit 209 about a vacancy for a print job, and determines, in accordance with the priority or the like, a print job to be executed from the print job data stored in the storage unit 205.

Inspection Apparatus

Figure 4:
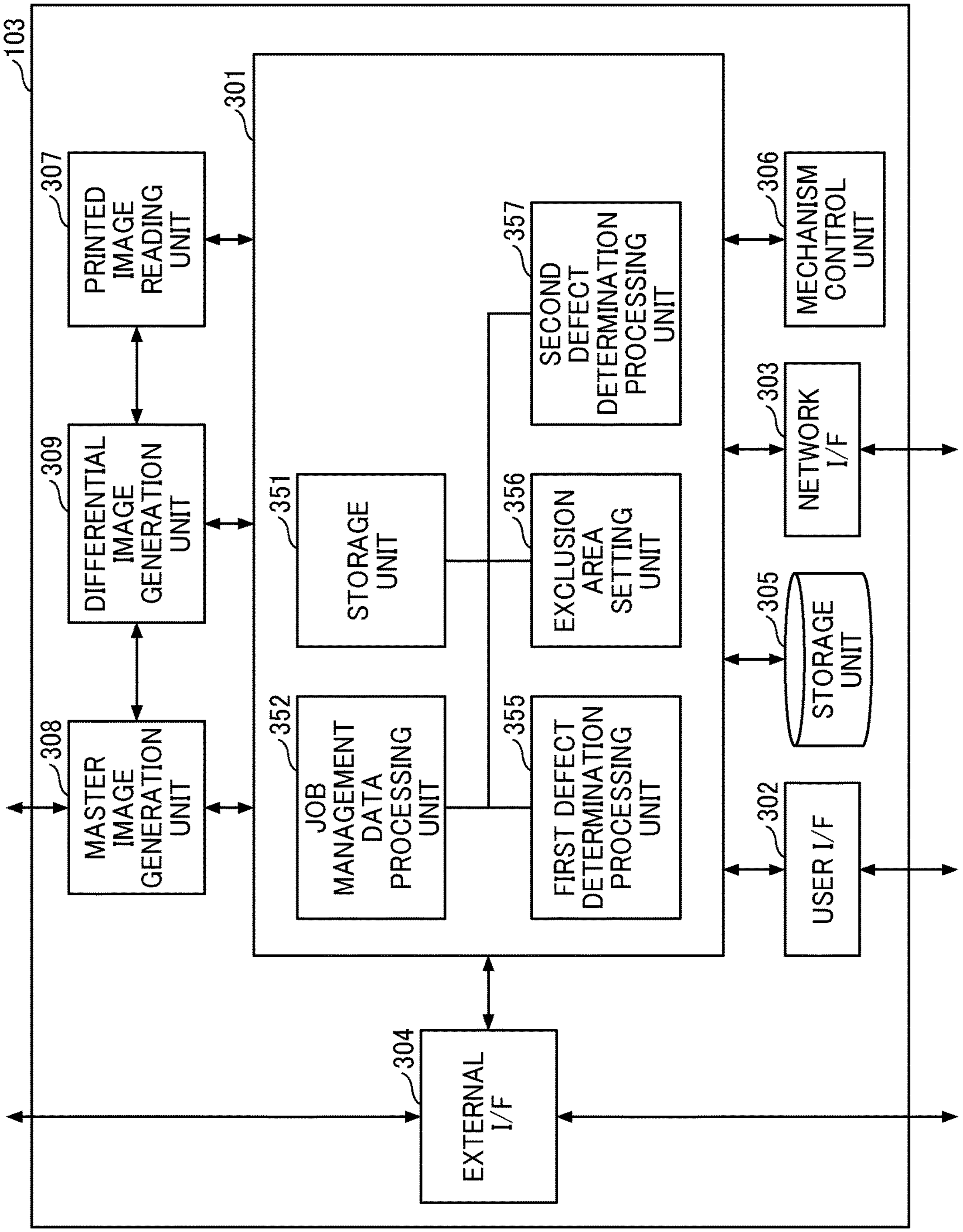
FIG. 4 is a block diagram illustrating an example configuration of an inspection apparatus.

FIG. 4 is a block diagram illustrating an example configuration of the inspection apparatus 103. The inspection apparatus 103 includes a system control section 301, a master image generation unit 308, a differential image generation unit 309, a printed image reading unit 307, an external I/F 304, a user I/F 302, a storage unit 305, a network I/F 303, and a mechanism control unit 306. The functional units of the inspection apparatus 103, which includes the system control section 301, the master image generation unit 308, the differential image generation unit 309, the printed image reading unit 307, and the mechanism control unit 306, are implemented by a CPU executing instructions according to one or more programs installed in the inspection apparatus 103.

The system control section 301 controls the entire inspection apparatus 103. The system control section 301 is connected to the master image generation unit 308, the differential image generation unit 309, the printed image reading unit 307, the external I/F 304, the user I/F 302, the storage unit 305, the network I/F 303, and the mechanism control unit 306.

The user I/F 302, which may be implemented by an interface circuit, is an interface that connects the system control section 301 to the operation device 133 illustrated in FIG. 1. The user I/F 302 causes the operation device 133 to display information managed by the system control section 301.

The network I/F 303, which may be implemented by an interface circuit, is an interface that connects the system control section 301 to a network such as a LAN.

The external I/F 304, which may be implemented by an interface circuit, is an interface to other devices (for example, the printer 101 and the stacker 104).

The mechanism control unit 306 controls operations of the mechanisms of the inspection apparatus 103, such as sheet conveyance, reading of both sides/single side of the sheet, and sheet ejection.

The storage unit 305 is implemented by any desired memory such as an HDD or an SSD. The storage unit 305 stores, for example, an inspection target image, a differential image, a master image, and an inspection result. The storage unit 305 also stores an inspection exclusion area.

The printed image reading unit 307 reads, with the reading devices 131 and 132, respective sides of the sheet conveyed from the printer 101 to generate an inspection target image, and outputs the inspection target image. The printed image reading unit 307 generates the inspection target images in both of a during-printing detection mode (described later) and a no-sheet-passing detection mode (described later). The during-printing detection mode is a mode in which a printed matter is inspected during execution of a print job. The no-sheet-passing detection mode is a mode in which a defect of the reading device 131 or 132 is detected before execution of a print job is started.

The master image generation unit 308 generates, in the during-printing detection mode, a master image from a RIP image transmitted by the DFE 150. The RIP image is generated from print data of the image formed on a sheet.

The differential image generation unit 309 generates, in the during-printing detection mode, a differential image between the master image and the inspection target image. The differential image is an image representing a difference between a pixel value of each pixel of the master image and a pixel value of a corresponding pixel of the inspection target image. The RIP image is generated from the print data of the image formed on a sheet. The first inspection target image is read from the printed matter. Thus, the pixel value of each pixel of the differential image is normally less than a threshold value.

The system control section 301 includes a storage unit 351, a job management data processing unit 352, a first defect determination processing unit 355, a second defect determination processing unit 357, and an exclusion area setting unit 356.

In the during-printing detection mode, the system control section 301 receives printing management information (included in the job management information) via the external I/F 304, and stores the printing management information in the storage unit 351 of the system control section 301. The job management data processing unit 352 extracts post-processing device information from the job management information illustrated in FIG. 5, and transmits, via the external I/F 304, the post-processing device information to the stacker 104 which is a post-processing apparatus downstream of the inspection apparatus 103. The job management data processing unit 352 reads the printing management information from the storage unit 351. The job management data processing unit 352 transfers the printing management information to the master image generation unit 308, the differential image generation unit 309, the printed image reading unit 307, and the mechanism control unit 306 so that these units process the print job. The transferred printing management information is the job management information illustrated in FIG. 5 from which the post-processing device information is removed.

In the during-printing detection mode, the system control section 301 stores the first inspection target image and the differential image in the storage unit 351, and sends a notification to the first defect determination processing unit 355. The first defect determination processing unit 355 applies a defect determination threshold value set in advance to the differential image to determine a defect. For example, the first defect determination processing unit 355 performs edge detection on the differential image to detect an edge having an intensity greater than the defect determination threshold value. The detected edge may have any shape such as a dot or line.

In the no-sheet-passing detection mode, the system control section 301 stores the second inspection target image in the storage unit 351, and sends a notification to the second defect determination processing unit 357. The second defect determination processing unit 357 applies a defect determination threshold value set in advance to the second inspection target image to determine a defect. The second inspection target image in the no-sheet-passing detection mode is a substantially uniform image of white pixels or black pixels as a whole if there is no defect such as dirt. The master image is an image of white pixels or black pixels as a whole. Alternatively, no master image may be used. The second defect determination processing unit 357 performs edge detection on the second inspection target image to detect an edge having an intensity greater than the defect determination threshold value. The detected edge may have any shape such as a dot or line.

The exclusion area setting unit 356 excludes a position of the defect detected by the second defect determination processing unit 357 or a position of the defect set by the user from an area where the first defect determination processing unit 355 detects a defect.

That is, the exclusion area setting unit 356 sets the inspection exclusion area where the first defect determination processing unit 355 does not detect a defect.

FIG. 5 illustrates an example of the job management information stored in the storage unit 553. This job management information is of the case where the printer 101 performs a normal printing process (the during-printing detection mode). In the printing process, at least one of the DFE 150 or the printer 101 generates print data for every single page. The print job is processed based on the job management information.

The job management information includes "parameter", "remark", and "initial value" fields. The "parameter" is an item name. The "remark" is description of the parameter. The "initial value" indicates a value of the parameter, which is to be received by the system control section 201 of the printer 101.

A job generation source is information indicating an output source of a job. The job generation source includes information indicating whether a job of interest is a print job entered from the DFE 150 or internal data of the printer 101.

A generation time is information about the date and time when the job generation source generated job information.

A page ID is an identification number of a print page. The page ID is incremented by 1 each time one page is processed since the power-on. The numerical value is set for the page ID when printing is performed.

A print face indicates whether the print job is for single-sided printing, for a front side in double-sided printing (double-sided front), or for a back side in double-sided printing (double-sided back).

A sheet ID is identification information of a sheet to be used in printing. In the case of double-sided printing, the pages to be printed on the same sheet are associated with the same sheet ID. The sheet ID is incremented by 1 each time one sheet is processed since the power-one. The numerical value is set for the sheet ID when printing is performed.

A copy ID is identification information in units of copies. The copy ID is incremented by 1 each time output of one copy is completed since the power-on. The numerical value is set for the copy ID when printing is performed.

A job ID is identification information in units of jobs. The job ID is incremented by 1 each time output of one job is completed since the power-on. The numerical value is set for the job ID when printing is performed.

A sheet type is information on the type of the sheet to be used in printing.

A sheet size is information on the size of the sheet.

A job type indicates whether the print job of interest is a print job subjected to defect detection, a print job not subjected to defect detection, or an interleaf for identification of defect detection.

Defect Detection Process

Figure 7:
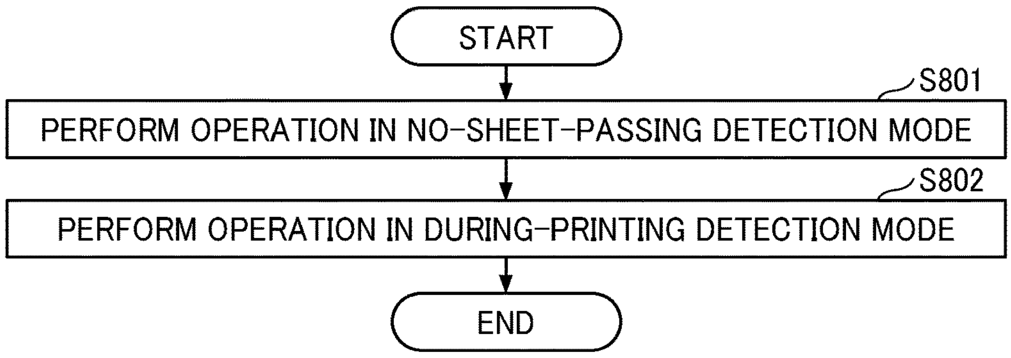
FIG. 7 is a flowchart illustrating example processing of registering an inspection exclusion area.

FIG. 7 is a flowchart illustrating example processing of registering an inspection exclusion area performed by the inspection apparatus 103. The processing of FIG. 7 is performed in response to power-on of the inspection apparatus 103, for example.

The system control section 301 of the inspection apparatus 103 performs an operation to detect a defect in the no-sheet-passing detection mode automatically or in response to a user operation (S801).

The system control section 301 causes the printed image reading unit 307 to generate the second inspection target image, based on an image of a predetermined reference face that is read by the reading devices 131 and 132.

The system control section 301 detects a defect caused by the reading device 131 or 132 without passing a sheet before actual printing is started using an actual print job. For example, the first defect determination processing unit 355 determines a defect by applying the defect determination threshold value set in advance, to the second inspection target image.

Figure 6:
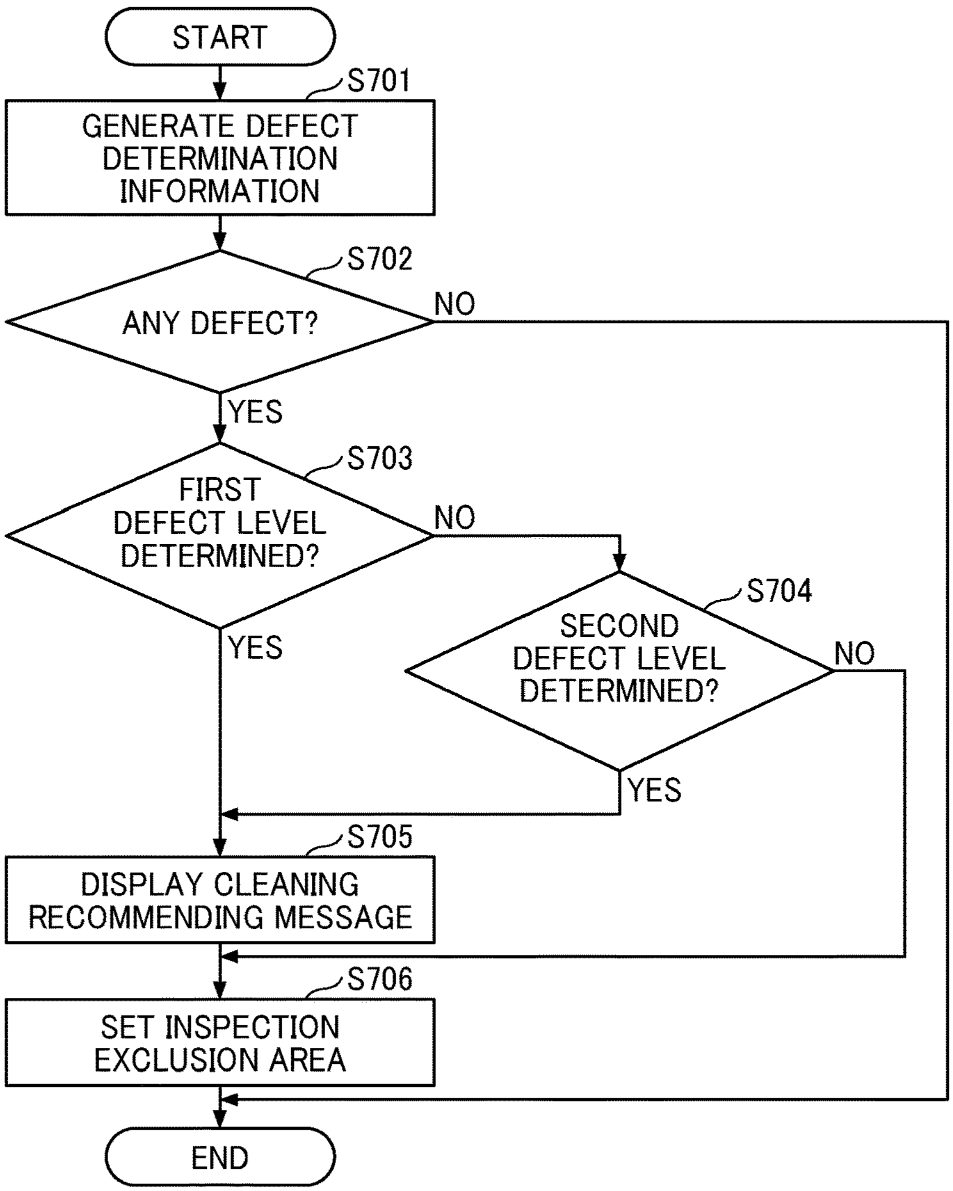
FIG. 6 is a flowchart illustrating example processing performed after a defect detection processing in a no-sheet-passing detection mode.

After a defect is detected in the second inspection target image generated without passing a sheet, the following processing of FIG. 6 is performed. For example, the system control section 301 sends a notification to the second defect determination processing unit 357.

As described below, before a screen is displayed to the user in step S706, the system control section 301 resets an inspection exclusion area to be registered in step S706. The exclusion area setting unit 356 then registers the inspection exclusion area set in step S706. Alternatively, the operation in the no-sheet-passing detection mode may be performed after actual printing is ended.

In response to the end of the no-sheet-passing detection mode, the system control section 301 performs an operation in the during-printing detection mode (S802).

Specifically, as described above, the system control section 301 generates the first inspection target image and the differential image, and sends a notification to the first defect determination unit 355.

In the during-printing detection mode, even if the first defect determination processing unit 355 detects a defect, the detected defect is not treated as a defect (for decreasing the printing quality) if such defect is in the registered inspection exclusion area. Although the alert is not issued, the system control section 301 may record the defect as the inspection result.

That is, in the during-printing detection mode, the defect caused by the reading device 131 or 132 is excluded from the detection target. This can omit or reduce in frequency cleaning for dealing with detection of such a defect.

FIG. 6 is a flowchart illustrating example processing performed by the inspection apparatus 103 after the defect detection process in the no-sheet-passing detection mode. Specifically, the processing of FIG. 6 is performed after the defect detection in no-sheet-passing detection mode is executed as described referring to S801 of FIG. 7. In the no-sheet-passing detection mode, the printed image reading unit 307 generates the second inspection target image in a state in which no sheet is conveyed. If the second inspection target image has a defect, the defect is highly likely to be a defect caused by (for example, dirt on) the reading device 131 or 132. The second defect determination processing unit 357 then performs the defect detection process on the second inspection target image.

First, the second defect determination processing unit 357 generates defect determination information (S701). The second defect determination processing unit 357 determines a defect in the second inspection target image based on the defect determination threshold value set in advance, and generates defect determination information including the number of reading-related defects detected in the no-sheet-passing detection mode, and positions of the reading-related defects detected in the no-sheet-passing detection mode.

The second defect determination processing unit 357 determines the presence or absence of a defect based on the defect determination information (S702). If there is no defect (No in S702), the process of FIG. 6 ends.

If there is a defect (Yes in S702), the second defect determination processing unit 357 performs a first defect level determination (S703). The first defect level determination is a determination as to whether there are one or more fatal defects. If the defects detected in step S701 do not include a defect that exceeds a defect width value or brightness difference value different from the background image, which is set in advance for the first defect level determination ("NO" in S703), the process proceeds to a second defect level determination in S704. If the defects detected in step S701 include a defect that exceeds the defect width value or brightness difference value from the background image, which is set in advance for the first defect level determination ("YES" in S703), the process proceeds to output of a cleaning recommending message in S705.

The threshold value for the first defect level determination and a threshold value for the second defect level determination have a relationship of "the threshold value for the first defect level determination>the threshold value for the second defect level determination". That is, the threshold value for the second defect level determination (an example of a second threshold value) is smaller than the threshold value for the first defect level determination (an example of a first threshold value). The first defect level determination is for determining a relatively severe defect, and corresponds to a method of determining a defect for which an alert is to be issued even through the number of defects is small. For example, the defect detected in the first defect level determination is a defect for which issuance of an alert is decided even if just a single defect is detected. The second defect level determination is for determining relatively minor defects, and corresponds to a method of determining defects that are permissible up to a certain number of defects. For example, a determination that an alert is waited until five (an example of a certain number) defects are detected is performed.

The defect level determination is performed in two steps, so that displaying of a cleaning recommending message even for a minor defect is avoided.

If the determination of step S703 is No, the second defect determination processing unit 357 performs the second defect level determination (S704). The second defect determination processing unit 357 determines whether the defects detected in step S701 include a defect that exceeds a defect width value or brightness difference value from the background image, which is set in advance for the second defect level determination, or the number of defects exceeds an upper-limit value of the number of defects set in advance for the second defect level determination.

If the determination of step S703 is Yes or if the detected defects include a defect with a brightness value exceeding the threshold value set in advance for the second defect level determination or the number of defects exceeds the upper-limit value of the number of defects set in advance for the second defect level determination (Yes in S704), the process proceeds to output of a cleaning recommending message (S705). This is because the reading device 131 or 132 is so dirty that cleaning by the user is desirable.

If the detected defects do not include any defect that exceeds the defect width value or brightness difference value from the background image, which is set in advance for the second defect level determination, or if the number of defects does not exceed the upper-limit value of the number of defects set in advance for the second defect level determination (No in S704), the process proceeds to setting of an inspection exclusion area (S706). This is because the defects can be handled with setting of the inspection exclusion area since the reading device 131 or 132 is not so dirty.

Figure 8:
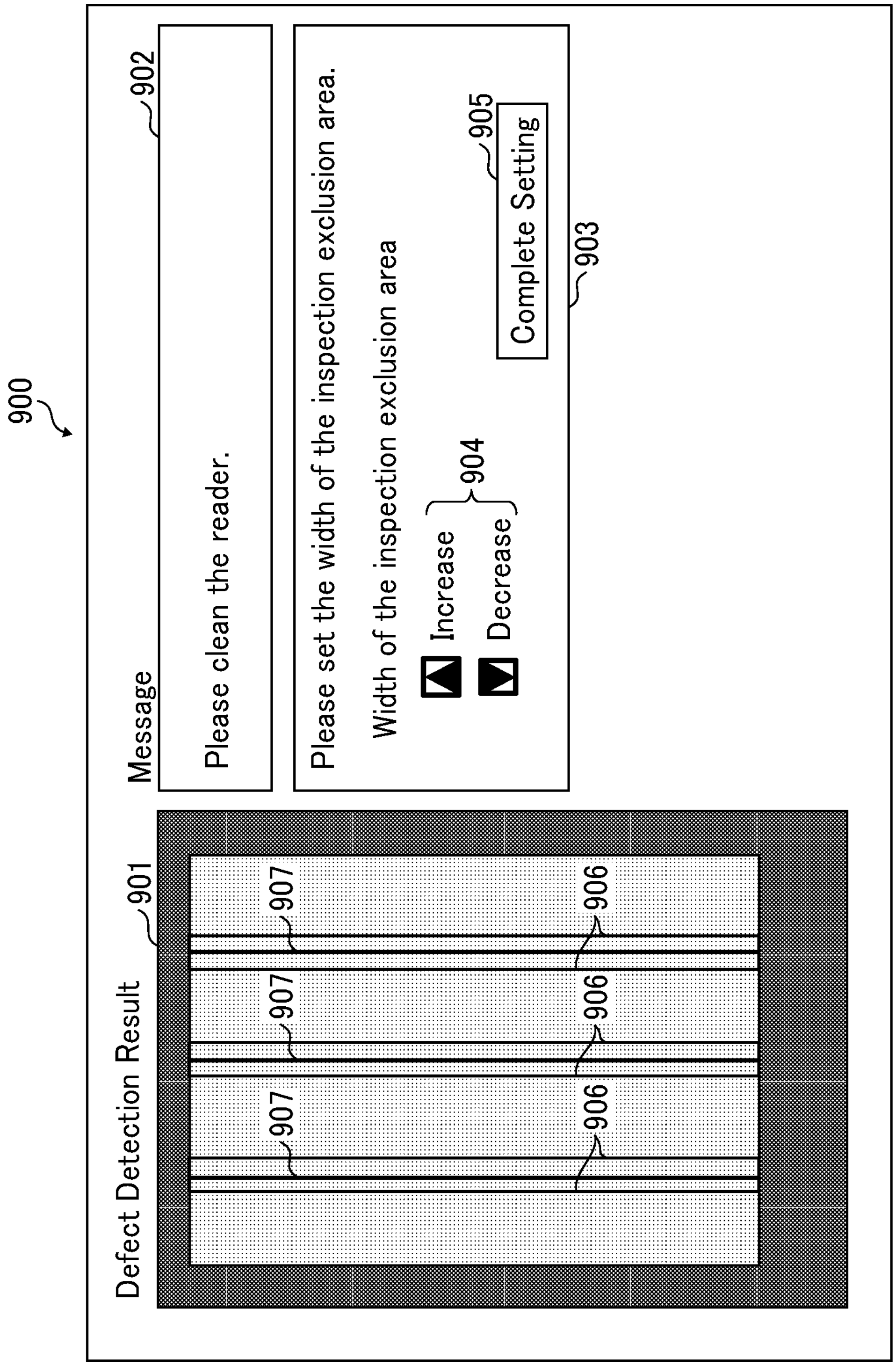
FIG. 8 is a diagram illustrating an example of a cleaning recommending message and an inspection exclusion area setting screen displayed by the inspection apparatus.

If display of the cleaning recommending message is set to "enabled" in advance, the user I/F 302 displays a message recommending cleaning of the reading device 131 or 132 in step S705 (S705). The message allows the user to notice that the reading device 131 or 132 is dirty at a cleaning desirable level. FIG. 8 illustrates an example of the cleaning recommending message.

If manual adjustment of the inspection exclusion area is set to "disabled" in advance, the exclusion area setting unit 356 sets the area where the defected is detected, as the inspection exclusion area (S706). The inspection exclusion area is registered irrespective of whether or not cleaning is performed in step S705. The position of the defect detected without passing a sheet is excluded from a defect detection area in the during-printing detection mode. This can omit or reduce in frequency cleaning for dealing with detection of a defect caused by the reading device 131 or 132.

If manual adjustment of the inspection exclusion area is set to "enabled" in advance, an inspection exclusion area setting screen is displayed. FIG. 8 illustrates an example of the inspection exclusion area setting screen. The user I/F 302 displays the width of the inspection exclusion area set to include the detected defect. The user performs an operation on the inspection exclusion area setting screen to adjust the inspection exclusion area. The exclusion area setting unit 356 sets the inspection exclusion area set by the user. Since the occurrence positions of the defects vary to some extent, the user adds a margin in the inspection exclusion area, so that a defect that is inadvertently left outside of the inspection exclusion area can be avoided.

Cleaning Recommending Message and Inspection Exclusion Area Setting Screen

FIG. 8 illustrates a cleaning recommending message 902 and an inspection exclusion area setting screen 900 displayed by the inspection apparatus 103, such as on the display of the operation device 133. The cleaning recommending message 902 is displayed in step S705. The inspection exclusion area setting screen 900 is displayed in step S706.

The inspection exclusion area setting screen 900 displays a defect detection result 901. The defect detection result 901 is a portion or the entirety of the second inspection target image generated without passing a sheet. The position of each detected defect is surrounded by a red frame 906. The inspection exclusion area is set also by the area within the red frame 906. For example, the red frame 906 serves as the inspection exclusion area. In FIG. 8, three streaky lines 907 are defects. Since the second inspection target image generated without passing a sheet has the defects, the reading device 131 or 132 presumably has a defect such as dirt.

The inspection exclusion area setting screen 900 also displays the cleaning recommending message 902. The cleaning recommending message 902 is, for example, "Please clean the reader". If display of the cleaning recommending message is set to "enabled" in advance, such a message is displayed.

If manual adjustment of the inspection exclusion area is set to "enabled" in advance, an inspection exclusion area setting field 903 is displayed. The inspection exclusion area setting field 903 is a setting field that allows the user to set the inspection exclusion area where even a defect is detected, the detected defect is not treated as a defect in the during-printing detection mode. The inspection exclusion area setting field 903 displays a button 904 for adjusting the width of the inspection exclusion area, and a setting completion button 905 for completing setting of the inspection exclusion area. In response to the user pressing the button 904 and adjusting the width of the inspection exclusion area, the range of the red frame 906 also changes accordingly. That is, the red frame 906 surrounding the streaky defect narrows or widens in conjunction with an operation on the button 904. In response to the user pressing the setting completion button 905, the inspection exclusion area setting screen 900 closes. The exclusion area setting unit 356 registers the range of the red frame 906 at the time of closing, as the inspection exclusion area. Such control is performed by the user I/F 302 under control of the system control section 301.

The printing system 100 according to the present embodiment excludes the position of a defect detected without passing a sheet from the defect detection area in the during-printing detection mode, and thus can omit or reduce in frequency cleaning for dealing with detection of a defect caused by the reading device 131 or 132.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

In the example configurations illustrated in FIG. 4, the inspection apparatus 103 is divided according to the main functions to facilitate understanding of the processes performed by the inspection apparatus 103. No limitation on the present disclosure is intended by how the functions are divided by process or by the name of the functions. The processes performed by the inspection apparatus 103 may be divided into more units of processing in accordance with the content of the processing. In addition, the division may be performed so that one processing unit contains more processing.

The printer 101 is not limited to an electrophotographic printer, and may be any printer that performs printing, such as a printer that uses an inkjet method, a thermal transfer method, a letterpress printing method, a planographic printing method, an intaglio printing method, a stencil printing method, or the like.

The printing system 100 is not limited to a system used for commercial printing, and may be used at an office, a factory, home, a convenience store, or the like.

The inspection apparatus 103 and the printer 101 may be separate apparatuses. The user causes the inspection apparatus 103 to read a printed matter. The inspection apparatus 103 stores therein the inspection exclusion area determined thereby.

The processes performed by the inspection apparatus 103 described in the present embodiment may be performed by a server apparatus connected via a network. The inspection apparatus 103 transmits the inspection target image to the server apparatus. The server apparatus transmits the inspection result to the inspection apparatus 103. The inspection apparatus 103 receives setting of the inspection exclusion area, and registers the inspection exclusion area therein or to the server apparatus.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality.

The invention claimed is:

1. A print system comprising:

a printing apparatus to print an image based on print data according to a print job data to generate a printed matter; and an inspection apparatus including circuitry configured to:

generate a second inspection target image based on a result of a reader reading a reference face and without reading an image of the printed matter;

detect a defect in the second inspection target image;

generate a first inspection target image, based on an image read at the reader from the printed matter printed at a printing apparatus;

determine at least one defect candidate in the printed matter, based on the first inspection target image and a master image generated from print data of the printed matter; and determine the at least one defect candidate is a defect in the printed matter in a case that the at least one defect candidate is present in the first inspection target image and is not present in the second inspection target image, defects present in both the first inspection target image and the second inspection target image are excluded from being determined to be defects in the printed matter.

2. The inspection apparatus according to claim 1, further comprising:

a user interface to display, on a display, a message prompting cleaning of the reader in the case where the defect is detected in the second inspection target image.

3. The inspection apparatus according to claim 2, wherein the user interface displays a position of the detected defect in the case where the defect is detected in the second inspection target image.

4. The inspection apparatus according to claim 3, wherein the user interface displays a display component for receiving a change of an area to be excluded from the area where a defect in the printed matter is inspected.

5. The inspection apparatus according to claim 4, wherein the user interface displays an area surrounding the position of the detected defect, as the area to be excluded from the area where a defect in the printed matter is inspected, and displays an area having been changed in response to an operation on the display component, as the area to be excluded.

6. The inspection apparatus according to claim 2, wherein the circuitry is configured to:

compare a magnitude of the defect in the second inspection target image each with a first threshold value and a second threshold value, the second threshold value being smaller than the first threshold value; and in a case where the magnitude of the defect in the second inspection target image is greater than or equal to the first threshold value, or in a case where the magnitude of the defect in the second inspection target image is less than the first threshold value, and the magnitude of the defect in the second inspection target image is greater than or equal to the second threshold value, the circuitry is configured to control the user interface to display the message prompting cleaning of the reader, the second inspection target image being determined to have the magnitude of the defect greater than or equal to the second threshold value, when second inspection target image includes a certain number or more of defects having a magnitude of the second threshold value or greater.

7. The inspection apparatus according to claim 2, wherein the circuitry is configured to:

compare a magnitude of the defect in the second inspection target image each with a first threshold value and a second threshold value, the second threshold value being smaller than the first threshold value;

in a case where the magnitude of the defect in the second inspection target image is greater than or equal to the first threshold value, the circuitry is configured to control the user interface to display the message prompting cleaning of the reader;

in a case where the magnitude of the defect in the second inspection target image is less than the first threshold value, and the magnitude of the defect in the second inspection target image is less than the second threshold value, the circuitry is configured not to display the message prompting cleaning of the reader, and exclude the position of the defect detected in the second inspection target image from the area where a defect in the printed matter is inspected, irrespective of the magnitude of the defect in the second inspection target image, the second inspection target image being determined to have the magnitude of the defect greater than or equal to the second threshold value, when the second inspection target image includes a certain number or more of defects having a magnitude of the second threshold value or greater.

8. An inspection method comprising:

printing an image based on print data according to print job data to generate a printed matter;

generating a second inspection target image based on a result of a reader reading a reference face and without reading an image of the printed matter;

detecting a defect in the second inspection target image;

generating a first inspection target image, based on an image read at the reader from the printed matter printed at a printing apparatus;

determining at least one defect candidate in the printed matter, based on the first inspection target image and a master image generated from print data of the printed matter; and determining the at least one defect candidate is a defect in the printed matter in a case that the at least one defect candidate is present in the first inspection target image and is not present in the second inspection target image, defects present in both the first inspection target image and the second inspection target image are excluded from being determined to be defects in the printed matter.

9. A non-transitory recording medium storing a plurality of instructions which, when executed by one or more processors, causes the processors to perform an inspection method, comprising:

printing an image based on print data according to print job data to generate a printed matter;

generating a second inspection target image based on a result of a reader reading a reference face and without reading an image of the printed matter;

detecting a defect in the second inspection target image;

generating a first inspection target image, based on an image read at the reader from the printed matter printed at a printing apparatus;

determining at least one defect candidate in the printed matter, based on the first inspection target image and a master image generated from print data of the printed matter; and determining the at least one defect candidate is a defect in the printed matter in a case that the at least one defect candidate is present in the first inspection target image and is not present in the second inspection target image, defects present in both the first inspection target image and the second inspection target image are excluded from being determined to be defects in the printed matter.

* * * * *